(12) United States Patent
Minge et al.

(10) Patent No.: US 7,674,868 B2
(45) Date of Patent: Mar. 9, 2010

(54) COPOLYMERS CONTAINING NANOPARTICLES

(75) Inventors: Oliver Minge, Munich (DE); Richard Weidner, Burghausen (DE); Frank Sandmeyer, Burgkirchen (DE); Hans-Peter Weitzel, Reischach (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 11/722,567

(22) PCT Filed: Dec. 22, 2005

(86) PCT No.: PCT/EP2005/013919

§ 371 (c)(1), (2), (4) Date: Jun. 22, 2007

(87) PCT Pub. No.: WO2006/072408

PCT Pub. Date: Jul. 13, 2006

(65) Prior Publication Data

US 2008/0146743 A1    Jun. 19, 2008

(30) Foreign Application Priority Data

Jan. 5, 2005    (DE) ........................ 10 2005 000 824

(51) Int. Cl.
*C08F 230/08* (2006.01)

(52) U.S. Cl. ........................ 526/279; 428/405; 428/407; 523/209

(58) Field of Classification Search ................. 526/279; 428/405, 407; 523/209
See application file for complete search history.

(56) References Cited

U.S. PATENT DOCUMENTS

| | | | |
|---|---|---|---|
| 4,157,321 A | 6/1979 | Kawakami et al. | |
| 4,617,327 A | 10/1986 | Podszun | |
| 5,618,879 A | 4/1997 | Cavivenc et al. | |
| 5,750,258 A * | 5/1998 | Sakai et al. | 428/405 |
| 6,756,437 B1 | 6/2004 | Besse et al. | |
| 6,833,401 B1 | 12/2004 | Xue et al. | |
| 7,153,899 B2 * | 12/2006 | Reddy et al. | 524/268 |
| 2002/0098243 A1 | 7/2002 | Edelmann et al. | |
| 2003/0114583 A1 | 6/2003 | Stark et al. | |
| 2003/0172845 A1 | 9/2003 | Marx et al. | |

FOREIGN PATENT DOCUMENTS

| | | |
|---|---|---|
| DE | 10100633 A | 6/2002 |
| DE | 10212121 A | 9/2003 |
| EP | 0352339 A | 1/1990 |
| EP | 0505230 A | 9/1992 |
| EP | 0635526 A | 1/1995 |
| EP | 0635526 B | 1/1995 |
| EP | 0691363 A | 1/1996 |
| EP | 0771826 A | 5/1997 |
| EP | 0943634 A | 9/1999 |
| EP | 1197502 A | 4/2002 |
| EP | 1216262 B | 6/2002 |
| EP | 1235869 B | 9/2002 |
| EP | 1256611 A | 11/2002 |
| EP | 1308468 A | 5/2003 |

OTHER PUBLICATIONS

M.S. El-Aasser, E.D. Sudol, Miniemulsions: Overview of Research and Applications (2002 Roy W. Tess Award in Coatings), JCT Research, Jan. 2004, No. 1, pp. 20-31.
Fox T. G., Bull., Am Physics Soc. 1, 3, 1956, p. 123.
K. Landester, Macromol Rapid Commun. Polyreactions in Miniemulsions, 2001, No. 22, pp. 896-936.
Peter A. Lovell, M.S. El-Aasser, Emulsion Polymerization and Emulsion Polymers, 1997, pp. 699-732, John Wiley and Sons, Chichester.
J. Wiley & Sons, Polymer Handbook, 2nd Edition, New York (1975).
Patent Abstract of Europa corresponding to EP 0505230 A.

\* cited by examiner

Primary Examiner—Margaret G Moore
(74) Attorney, Agent, or Firm—Brooks Kushman P.C.

(57) ABSTRACT

The invention provides copolymers of ethylenically unsaturated monomers and of ethylenically functionalized nanoparticles in the form of their aqueous polymer dispersions or water-redispersible polymer powders, obtainable by means of free-radically initiated polymerization in an aqueous medium and, if desired, subsequent drying of the resultant polymer dispersion, of A) one or more monomers from the group consisting of vinyl esters, (meth)acrylic esters, vinylaromatics, olefins, 1,3-dienes, vinyl ethers and vinyl halides and, if desired, further monomers copolymerizable therewith, in the presence of B) at least one particle P having an average diameter of $\leq 1000$ nm, which is functionalized with ethylenically unsaturated, free-radically polymerizable groups, characterized in that B2) particles P used are one or more from the group of metal oxides and semimetal oxides, and/or B2) particles P used are silicone resins composed of repeating units of the general formula $[R^4_{(p+z)}SiO_{(4-p-z)/2}]$ (II), where for at least 20 mol % of the respective silicone resin p+z=0, 1 or 3,
and where B1) and B2) are each functionalized with one or more α-organosilanes of the general formula $(R^1O)_{3-}(R^2)_n Si-(CR^3{}_2)-X$ (I), where X is a radical having 2 to 20 hydrocarbon atoms and containing an ethylenically unsaturated group.

24 Claims, No Drawings

_US 7,674,868 B2_

COPOLYMERS CONTAINING NANOPARTICLES

CROSS-REFERENCE TO RELATED APPLICATION

This application is the U.S. national phase of PCT Appln. No. PCT/EP2005/013919 filed Dec. 22, 2005, which claims priority to German Application No. 10 2005 000 824.0 filed Jan. 5, 2005.

BACKGROUND OF THE INVENTION

1. Field of the Invention

The invention relates to copolymers of ethylenically unsaturated monomers and of ethylenically functionalized nanoparticles in the form of their aqueous dispersions or water-redispersible powders, and to their preparation and use.

2. Description of the Related Art

Polymer dispersions which comprise particles having dimensions in the nanometer range, e.g. particles measuring less than 100 nm in at least one dimension, have a host of innovative properties which are superior to those of composites containing particles which are not so fine, in the micrometer range, for instance. These properties include, for example, light scattering, adsorbency and absorbency, antibacterial properties, or superior scratch resistance and tensile strength. These "nanoeffects" correlate directly to the size of the particles and are lost if the particles exceed certain dimensions.

Furthermore, the desired effects are only particularly pronounced when success is achieved in distributing the particles as homogeneously as possible in the polymer matrix and, if possible, attaching them chemically to it, in order to prevent leaching or agglomeration phenomena and hence a loss of these special properties.

One way of chemically attaching nanoscale metal oxides to polymeric matrices is described for example in DE 10212121 A1 for nano-zinc oxide polymer dispersions. The zinc oxide particles are dispersed in a halogen-containing medium, the dispersion is introduced into an aqueous solution of hydroxyl-containing inorganic polymers, such as of hydrolysed polyalkyl(alkoxy)siloxanes, and then the halogen-containing constituents are removed by distillation. Chemical attachment to the polymer thus takes place via the formation of a Zn—O—Si—O—C bridge and is therefore very unstable with respect to acidic or alkaline cleavage.

Where the particles are silicone resins it is known that they can be used for chemical modification of organic polymers or as binders of coatings in order to increase the resistance of the coatings, for example, to weathering effects, chemical attack and thermal loading. Commercially available products are, for example, silicone polyesters, hybrid systems of silicone resins and organic polymers of the kind used to produce coil coatings. These products are preferably prepared by chemical reaction and bond formation between the silicone resin and the organic polymer. Chemical attachment of the silicone resins to the organic polymer takes place in general by the formation of an Si—O—C bridge between the two, typically in a solvent operation. For aqueous media the literature includes a variety of products comprising combinations of organic polymers with silicone resins or resin-like oligomeric silicone structures, and processes for their preparation:

EP 1256611 A2 describes an aqueous dispersion obtained from a mixture and emulsion of non-free-radically polymerizable alkoxysilanes or their hydrolysis and condensation products with free-radically polymerizable monomers. The silanes or products derived therefrom are hydrolysed and condensed, while the organic monomers are free-radically polymerized. The silanes used in this case are alkyl- or arylalkoxysilanes, for which there can be up to three alkoxy groups attached to silicon. It is possible therefrom, by means of hydrolysis and condensation, to access resins or resin-like oligomers, inter alia.

EP 1197502 A2 teaches the preparation of an aqueous resin emulsion by free-radical polymerization of ethylenically unsaturated monomers in the presence of hydrolysable and condensable mono-, di- or trialkoxyalkyl- or -aryl-silanes which are not free-radically polymerizable.

EP 943634 A1 describes aqueous latices intended for use as coating materials and prepared by copolymerizing ethylenically unsaturated monomers in the presence of a silicone resin containing silanol groups. In this case interpenetrating networks (IPNs) are formed between the polymer chains and the polysiloxane chains.

The silicone resin emulsion polymers obtainable by the stated processes, and also the otherwise well-known physical mixtures of silicone resin emulsions and organic polymer dispersions, for use for example in the field of silicone resin masonry paints, are notable for the fact that the silicone resin and the organic polymer are present, exclusively or predominantly, in the form of physical blends. Chemical bonds between the silicone fraction and the organic fraction form on more of a chance basis, and are Si—O—C bonds, which are susceptible to hydrolysis. The Si—O—C bond is always in competition with the formation of Si—O—Si bridges as a result of condensation of the silanol groups with one another.

The condensation reactions of the silane units or their hydrolysed and partially-condensed oligomers under the hydrolytic conditions of emulsion polymerization cannot be adequately controlled. It is known that alkoxysilanes having short, oxygen-attached alkyl radicals, in particular, have a pronounced tendency, under hydrolytic conditions, to continue condensing until they form solid particles. These particles tend to form precipitates and domains, and hence tend towards separation. The greater the number of alkoxy groups attached to the silicon, the more pronounced this tendency. In a coating material application, this may have an adverse effect in the form of pinholes being formed. Separation may detract from the storage stability and functional capacity of the products.

A more defined attachment of the silicone unit to the organic polymer, via the formation of C—C bonds, may be accomplished by copolymerizing double bond-functionalized silicones with organic monomers. For example, EP 1308468 A1 describes hydrophobically modified copolymers obtained by copolymerizing linear silicones having up to two polymerizable groups in emulsion with organic monomers. A similar approach is taken by EP 352339 A1, in which vinyl-terminated, linear polydimethylsiloxanes are copolymerized with (meth)acrylate monomers. EP 771826 A2 describes the emulsion polymerization of (meth)acrylic esters and vinylaromatics, crosslinking being effected by addition of difunctional silicones containing acrylic or vinyl groups. EP 635 526 A1 describes functional graft polymers which are based on organopolysiloxanes and are obtained by grafting ethylenically unsaturated monomers onto polyorganosiloxanes which contain hydrogen or functional groups, and also ethylenically unsaturated groups.

The preparation of organocopolymer dispersions containing particles is subject matter of EP 1216262 B1 and EP 1235869 B1, where an aqueous dispersion of inorganic particulate solids and organic polymer is prepared using inorganic particulate solids which are characterized by a defined degree of dispersion and a defined electrophoretic mobility and in whose presence ethylenically unsaturated monomers are polymerized. EP 505230 A1 describes the encapsulation of silica particles with organic polymer, the silica particles first being functionalized with ethylenically unsaturated alkoxysilane compounds and then ethylenically unsaturated monomers being polymerized in aqueous dispersion in the presence of the functionalized particles.

SUMMARY OF THE INVENTION

The attachment of polymer to nanoparticle has been unsatisfactory to date because no stable C—C bond has been obtained.

The object was therefore to provide particle-containing dispersions in which a stable attachment of the polymer component to the nanoparticle is accomplished with simplicity. The covalent chemical bonding of the particles to the organic matrix via C—C bonds in aqueous medium has now been achieved by functionalizing the particles to be bonded with a special class of ethylenically unsaturated silanes characterized solely by one carbon atom between the silane functionality and the organic functionality ("-silanes"). In contradistinction to reagents employed hitherto, the silanes have a high level of reactivity with respect to functionalization and at the same time are surprisingly stable under the polymerization conditions. It has been found, moreover, that the polymerization conditions are selected, in contrast to the state of the art, in such a way that effective copolymerization of the hydrophobic particles with organic monomers is carried out in the aqueous medium while at the same time very substantially retaining the particle identity.

DETAILED DESCRJPTION OF THE PREFERRED EMBODIMENT(S)

The invention thus provides copolymers of ethylenically unsaturated monomers and of ethylenically functionalized nanoparticles in the form of their aqueous polymer dispersions or water-redispersible polymer powders, obtainable by means of free-radically initiated polymerization in an aqueous medium and, if desired, subsequent drying of the resultant polymer dispersion, of A) one or more monomers from the group consisting of vinyl esters, (meth)acrylic esters, vinylaromatics, olefms, 1,3-dienes, vinyl ethers and vinyl halides and, if desired, further monomers copolymerizable therewith, in the presence of B) at least one particle P having an average diameter of 1000 nm, which is functionalized with ethylenically unsaturated, free-radically polymerizable groups, characterized in that B1) particles P used are one or more from the group of metal oxides and semimetal oxides, and/or B2) particles P used are silicone resins composed of repeating units of the general formula $[R^4{}_{(p+z)}SiO_{(4-p-z)/2}]$ (II), each $R^4$ being identical or different and denoting hydrogen, hydroxyl, or alkyl, cycloalkyl, aryl, alkoxy or aryloxy radicals each having up to 18 carbon atoms and being able to be optionally substituted, where for at least 20 mol % of the respective silicone resin p+z=0, 1 or 3, and where B1) and B2) are each functionalized with one or more -organosilanes of the general formula $(R^1O)_{3-n}(R^2)_nSi—(CR^3{}_2)—X$ (I), where $R^1$ is hydrogen, an alkyl radical having 1 to 6 carbon atoms or an aryl radical, $R^2$ and $R^3$ each independently of one another are hydrogen, an alkyl radical having 1 to 12 carbon atoms or an aryl radical, n can be 0, 1 or 2 and X is a radical having 2 to 20 hydrocarbon atoms and containing an ethylenically unsaturated group.

Suitable vinyl esters are those of carboxylic acids having 1 to 15 carbon atoms. Preference is given to vinyl acetate, vinyl propionate, vinyl butyrate, vinyl-2-ethylhexanoate, vinyl laurate, 1-methylvinyl acetate, vinyl pivalate and vinyl esters of -branched monocarboxylic acids having 9 to 11 carbon atoms, examples being VeoVa9$^R$ and VeoVa10$^R$ (trade names of Hexion Speciality Chemical, formerly Resolution Products). Vinyl acetate is particularly preferred.

Suitable monomers from the group of acrylic esters or methacrylic esters are esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, tert-butyl acrylate, tert-butyl methacrylate, 2-ethylhexyl acrylate and norbornyl acrylate. Particular preference is given to methyl acrylate, methyl methacrylate, n-butyl acrylate, isobutyl acrylate, tert-butyl acrylate, 2-ethylhexyl acrylate, and norbornyl acrylate.

Preferred vinylaromatics are styrene, alpha-methylstyrene, the isomeric vinyltoluenes and vinylxylenes, and divinylbenzenes. Styrene is particularly preferred.

The vinyl halogen compounds include vinyl chloride, vinylidene chloride, and also tetrafluoroethylene, difluoroethylene, hexylperfluoroethylene, 3,3,3-trifluoropropene, perfluoropropyl vinyl ether, hexafluoropropylene, chlorotrifluoroethylene and vinyl fluoride. Vinyl chloride is particularly preferred.

An example of a preferred vinyl ether is methyl vinyl ether.

The preferred olefins are ethene, propene, 1-alkylethenes and polyunsaturated alkenes, and the preferred dienes are 1,3-butadiene and isoprene. Particular preference is given to ethene and 1,3-butadiene.

If desired it is additionally possible to copolymerize 0.1% to 5% by weight of auxiliary monomers, based on the total weight of the monomers A). It is preferred to use 0.5% to 2.5% by weight of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carbonitriles, preferably acrylamide and acrylonitrile; monoesters and diesters of fumaric acid and maleic acid such as the diethyl and diisopropyl esters; and also maleic anhydride; ethylenically unsaturated sulphonic acids and their salts, preferably vinylsulphonic acid and 2-acrylamido-2-methylpropanesulphonic acid. Further examples are pre-crosslinking comonomers such as polyethylenically unsaturated comonomers, examples being divinyl adipate, diallyl maleate, allyl methacrylate or triallyl cyanurate, or after-crosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylolmethacrylamide and of N-methylolallylcarbamate. Also suitable are epoxy-functional comonomers such as glycidyl methacrylate and glycidyl acrylate. Mention may also be made of monomers containing hydroxyl or CO groups, examples being hydroxyalkyl methacrylates and acrylates such as hydroxyethyl, hydroxypropyl or hydroxybutyl acrylate or methacrylate and also compounds such as diacetoneacrylamide and acetylacetoxyethyl acrylate or methacrylate.

Particularly preferred comonomers A) are one or more monomers from the group of vinyl acetate, vinyl esters of α-branched monocarboxylic acids having 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene and 1,3-butadiene. Particularly preferred comonomers A) are also mixtures of vinyl acetate and ethylene; mixtures of vinyl acetate, ethylene and a vinyl ester of α-branched monocarboxylic acids having 9 to 11 carbon atoms; mixtures of n-butyl acrylate and 2-ethylhexyl acrylate and/or methyl methacrylate; mixtures of styrene and one or more monomers from the group of methyl acrylate, ethyl acrylate, propyl acrylate, n-butyl acrylate and 2-ethylhexyl acrylate; mixtures of vinyl acetate and one or more monomers from the group of methyl acrylate, ethyl acrylate, propyl acrylate, n-butyl acrylate, 2-ethylhexyl acrylate and, if desired, ethylene; mixtures of 1,3-butadiene and styrene and/or methyl methacrylate; the stated mixtures may if desired additionally include one or more of the abovementioned auxiliary monomers.

The monomer selection and/or the selection of the weight fractions of the comonomers is or are made so as to result in general in a glass transition temperature, Tg, of ≦60° C., preferably −50° C. to +60° C. The glass transition temperature Tg of the polymers can be determined in a known way by means of differential scanning calorimetry (DSC). The Tg values may also be calculated approximately in advance by means of the Fox equation. According to Fox T. G., Bull. Am. Physics Soc. 1, 3, page 123 (1956) it is the case that: $1/Tg=x1/Tg1+x2/Tg2+ \ldots +xn/Tgn$, where xn is the mass fraction (% by weight/100) of the monomer n and Tgn is the glass transition temperature, in kelvins, of the homopolymer of the monomer n. Tg values for homopolymers are listed in Polymer Handbook 2nd Edition, J. Wiley & Sons, New York (1975).

The fraction of the comonomers A is preferably ≧50% by weight, more preferably 70% to 90% by weight, based in each case on the total weight of A) and functionalized B).

Suitable particles P are particles from the group B1) of silicas and metal oxides. The metal oxides are the oxides of the metals aluminium, titanium, zirconium, tantallum, tungsten, hafnium, zinc and tin, preferably. Among the silicas, particular preference is given to colloidal silica, pyrogenic or fumed silica, precipitated silica, or silica sols. Among the metal oxides particular preference is given to aluminas such as corundum, mixed oxides of aluminium with other metals and/or silicon, titanium oxides, zirconium oxides and iron oxides.

Preferred particles P from the group of the silicone resins are those composed of at least 30 mol % of Q units in other words for which p+z in the general repeating formula $[R^4_{(p+z)}SiO_{(4-p-z)/2}]$ (II) has the definition 0. Particularly preferred silicone resins are those composed only of M and Q units, in other words for which p+z in the general formula $[R^4_{(p+z)}SiO_{(4-p-z)/2}]$ (II) has only the definition 0 and 3. If the radicals $R^4$ are substituted, then they may additionally contain one or more identical or different heteroatoms selected from O, S, Si, Cl, F, Br, P or N atoms. Also suitable, furthermore, are silicone resins of the kind composed of an arbitrary combination of M units ($R_3SiO$—), D units (—$OSiR_2O$—), T units ($RSiO_3^{3-}$) and Q units ($SiO_4^{4-}$), with the proviso that T units and/or Q units are always present and that their fraction as a proportion of the units of which the silicone resin is composed totals at least 20 mol % and, where only one of these units is present, its fraction is at least 20 mol % in each case.

Silicone resins B2) most preferred are those composed essentially only of M and Q units, the molar ratio of M/Q units ranging from 30/70 to 60/40, and particular preference being given to resins having an M/Q ratio of 35/65 to 45/55. Resins most preferred are, in addition, those composed predominantly of T units, particularly those composed of >80 mol % T units, and very particularly those composed of virtually 100 mol % of T units.

The particles P preferably possess an average diameter of 1 to 1000 nm, more preferably 1 to 100 nm, the particle size being determined by transmission electron microscopy on the resulting dispersions or on the films obtainable from the dispersions.

By α-organosilanes are meant those silanes in which the alkoxy-, aryloxy- or OH-substituted silicon atom is connected directly via a methylene bridge to an unsaturated hydrocarbon radical which has one or more ethylenically unsaturated carbon bonds, it also being possible for the hydrogen radicals of the methylene bridge to be replaced by alkyl and/or aryl radicals, and there is a C=C double bond positioned a to the Si atom.

Suitable α-organosilanes of the formula $(R^1O)_{3-n}(R^2)_nSi$—$(CR^3_2)$—X (I) are also those in which the carbon chains of the radicals $R^1$, $R^2$ and $R^3$ are interrupted by non-adjacent oxygen, sulphur or $NR^4$ groups. Preferred radicals $R^1$ and $R^2$ are unsubstituted alkyl groups having 1 to 6 carbon atoms and preferred radical $R^3$ is hydrogen. The radical X may be linear, branched or cyclic. Besides the double bond there may also be further functional groups present, which are generally inert with respect to an olefinic polymerization, examples being halogen, carboxyl, sulphinato, sulphonato, amino, azido, nitro, epoxy, alcohol, ether, ester, thioether and thioester groups and also aromatic isocyclic and heterocyclic groups. Preferred examples of X are monounsaturated $C_2$ to $C_{10}$ radicals; maximum preference as radical X is given to the acryloyl and methacryloyl radical.

The fraction of the functionalized particles P is 0.5% to 50% by weight, preferably 1% to 30% by weight, more preferably 10% to 20% by weight, based in each case on the total weight of component A) and of the functionalized component B).

In addition, the polymer dispersions and polymer powders of the invention may further contain up to 30% by weight, based on the total weight of components A) and B), of at least one silane of the general formula $(R^5)_{4-m}$—Si—$(OR^6)_m$(III), where m is a number of value 1, 2, 3 or 4, R5 is an organofunctional radical selected from the group of alkoxy radical and aryloxy radical, each having 1 to 12 carbon atoms, phosphonic monoester radical, phosphonic diester radical, phosphonic acid radical, methacryloyloxy radical, acryloyloxy radical, vinyl radical, mercapto radical, isocyanato radical, the isocyanato radical being able optionally to be reaction-blocked for protection against chemical reactions, hydroxyl radical, hydroxyalkyl radical, vinyl radical, epoxy radical, glycidyloxy radical, morpholino radical, piperazino radical, a primary, secondary or tertiary amino radical having one or more nitrogen atoms, it being possible for the nitrogen atoms to be substituted by hydrogen or by monovalent aromatic, aliphatic or cycloaliphatic hydrocarbon radicals, carboxylic acid radical, carboxylic anhydride radical, aldehyde radical, urethane radical, urea radical, it being possible for the radical $R^5$ to be attached directly to the silicon atom or to be separated therefrom by a carbon chain of 1 to 6 carbon atoms, and $R^6$ being a monovalent linear or branched aliphatic or cycloaliphatic hydrocarbon radical or a monovalent aromatic hydrocarbon radical having in each case 1 to 12 carbon atoms, or a radical —C(=O)—$R^7$,$R^7$ being a monovalent linear or branched aliphatic or a cycloaliphatic hydrocarbon radical having in each case 1 to 12 carbon atoms or a monovalent aromatic hydrocarbon radical. The selected silane or, if desired, the selected silanes may be present in a non-hydrolysed form, in hydrolysed form or in hydrolysed and partially-condensed or hydrolysed and fully condensed form, or in a mixture of these forms.

In the case of mimemulsion polymerization, furthermore, it is possible if desired for hydrophobic additives to be present in amounts of up to 3% by weight (referred to as "co-surfactants" or "hydrophobes"), based on the total weight of component A) and of functionalized component B). In the present case it is often possible for silicone particles to take on the function of the "co-surfactant". Further examples of co-surfactants are hexadecane, cetyl alcohol, oligomeric cyclosiloxanes, such as octamethylcyclotetrasiloxane, and also vegetable oils such as rapeseed oil, sunflower oil or olive oil. Additionally suitable are organic or inorganic polymers having a number-average molecular weight of <10,000. Inventively preferred hydrophobes are the silicone particles for polymerization themselves, and also D3, D4 and D5 rings and hexadecane. Particular preference is given to the silicone particles to be polymerized and to hexadecane.

The copolymers are prepared in a hetero-phase operation in accordance with the known techniques of the suspension, emulsion or miniemulsion polymerization (cf. e.g. Peter A. Lovell, M. S. El-Aasser, "Emulsion Polymerization and Emulsion Polymers", 1997, John Wiley and Sons, Chichester). In one particularly preferred form the reaction is carried out in accordance with the methodology of miniemulsion polymerization. Miniemulsion polymerizations differ in a number of key points, which make them particularly suitable for copolymerizing water-insoluble comonomers, from other heterophase polymerizations (cf. e.g. K. Landfester, "Polyreactions in Miniemulsions", Macromol. Rapid. Commun. 2001, 22, 896-936 and M. S. El-Aasser, E. D. Sudol, "Miniemulsions: Overview of Research and Applications", 2004, JCT Research, 1, 20-31).

The reaction temperatures are situated at 0° C. to 100° C., preferably 5° C. to 80° C., more preferably 30° C. to 70° C. The pH of the dispersing medium is between 2 and 9, preferably between 4 and 8. In one particularly preferred embodiment it is between 6.5 and 7.5. The adjustment of the pH before the beginning of the reaction can be made by means of hydrochloric acid or sodium hydroxide solution. The polymerization may be conducted batchwise or continuously, with all or some constituents of the reaction mixture being included in the initial charge, with some constituents of the reaction mixture being included partly in the initial charge and partly metered in subsequently, or by the metering process without an initial charge. All metered additions are made preferably at the rate at which the component in question is consumed.

The polymerization is initiated by means of the customary water-soluble initiators or redox initiator combinations. Examples of initiators are the sodium, potassium and ammonium salts of peroxodisulphuric acid, hydrogen peroxide, tert-butyl peroxide, tert-butyl hydroperoxide, potassium peroxodiphosphate, tert-butyl peroxopivalate, cumene hydroperoxide, isopropylbenzene monohydroperoxide and azobisisobutyronitrile. The stated initiators are used preferably in amounts of 0.01% to 4.0% by weight, based on the total weight of the monomers. Redox initiator combinations used are abovementioned initiators in conjunction with a reducing agent. Suitable reducing agents are sulphites and bisulphites with monovalent cations, examples being sodium sulphite, the derivatives of sulphoxylic acids such as zinc or alkali metal formaldehyde-sulphoxylates, an example being sodium hydroxymethanesulphinate, and ascorbic acid. The amount of reducing agent is preferably 0.15% to 3% by weight of the monomer amount used. In addition it is possible to introduce small amounts of a metal compound which is soluble in the polymerization medium and whose metallic component is redox-active under the polymerization conditions, being based for example on iron or on vanadium. One particularly preferred initiator system comprising the aforementioned components is the system tert-butyl hydroperoxide/sodium hydroxymethanesulphinate/Fe(EDTA)$^{2+/3+}$.

In the case of a reaction regime in accordance with the miniemulsion polymerization methodology it is also possible to use predominantly oil-soluble initiators, such as cumene hydroperoxide, isopropylbenzene monohydroperoxide, dibenzoyl peroxide or azobisisobutyronitrile. Preferred initiators for miniemulsion polymerizations are potassium persulphate, ammonium persulphate, azobisisobutyronitrile and dibenzoyl peroxide.

The dimensions of the particle domains within the copolymer after copolymerization has taken place are preferably in the range from 1 nm to 1000 nm, in particular from 1 nm to 500 nm and with very particular preference 1 nm to 200 nm. The dimensions can be determined by means for example of scanning electron microscopy or transmission electron microscopy on the polymer dispersions or on the polymer films obtained from them.

To produce water-redispersible polymer powders the aqueous dispersions of the copolymers of the invention are dried in a manner known to the skilled person, preferably by the spray drying method.

The copolymers of the invention in the form of their dispersions and redispersible powders are used preferably as binders for producing coatings. They possess high stabilities on storage. To coatings in which they are used as binders they impart excellent resistance, for example, to weathering effects, to chemical attack and to UV radiation. With these coatings it is also possible to realise very good water resistance and a low soiling tendency. With hydrophobically formulated copolymers, moreover, porous coatings can be realised which have a pigment volume concentration above the critical pigment volume concentration, and which are distinguished by excellent gas permeability and water vapour permeability in conjunction with a high level of water repellency. By virtue of the copolymerization into the copolymer of silanes containing hydrolysable and condensable groups, binders can be prepared which are moisture-curing after application, thereby allowing adjustment of the film hardnesses, the thermoplasticity and the soiling tendency.

As well as for this purpose, the copolymers of the invention in the form of their dispersions and redispersible powders can also be used as additives to preparations for coatings or for other utilities, and also, without further additives, can be used as pure film-forming material over substrates or material which cures to blocks or other, arbitrary forms.

Examples of fields of application in which the copolymers of the invention, in the form of their dispersions and redispersible powders, allow the qualities identified above to be manipulated include the preparation of coating materials and impregnating systems and resultant coatings and coverings on substrates, such as metal, glass, wood, mineral substrate, synthetic and natural fibres for producing textiles, carpets, floor coverings, or other goods which can be produced from fibres, leather, or plastics such as films and mouldings. The copolymers of the invention, in liquid form or in cured solid form, can be incorporated into elastomer compounds. In that case they may serve for reinforcement or for enhancement of other service properties such as the control of transparency, heat resistance, yellowing tendency and/or weathering stability.

Depending on application it is possible if desired for one or more additives to be added to the copolymers. Examples of such are solvents or film-forming assistants; mixtures of at least two organic solvents; pigment wetting agents and dispersants; additives which impart surface effects, such as, for example, those used for obtaining textures such as the hammer finish or orange peel texture; antifoams; substrate wetting agents; surface levelling agents; adhesion promoters; release agents; further organic polymer, not identical with the organic polymer A); surfactant; hydrophobic auxiliary; a non-free-radically polymerizable silicone resin.

By functionalizing particles with olefinic groups it is possible to produce super-crosslinking units which are able to act as multifunctional monomers during the copolymerization with ethylenically unsaturated compounds. The polymerization can be conducted in an aqueous medium by an emulsion polymerization, and leads to stable, hydrophobically modified copolymer dispersions. In this way, depending on the degree of functionalization of the particles, hybrid polymers result which have a low to high degree of crosslinking. These hybrid polymers are notable for the fact that the functionalized particles are attached to the organic polymer via in each case at least one C—C bond and, in comparison to systems containing only linear units with low degrees of crosslinking, additionally exhibit a heightened mechanical resistance.

In comparison to systems which crosslink only by formation of M-O-M (M=metal), Si—O—Si, or M-O—Si bonds, the particle-containing dispersions and redispersible powders of the invention additionally, by virtue of the C—C linkage, have a heightened environmental resistance and chemical resistance with respect, for example, to strongly acidic or alkaline media.

This resistance can be increased further if additional crosslinking between the particles is able to take place through M-O—Si—O—Si-M as a result of the additional presence of silanol groups and/or alkoxy groups on the surface of the particles, in addition to the linking of the particle to the organic matrix via formation of C—C bonds. If, by the addition of free-radically polymerizable silanes, alkoxysilyl functions and/or silanol functions are additionally incorporated into the polymer sidechains, it is possible for an additional after-crosslinking to take place by the formation of Si—O—Si bonds between particle and sidechain or between sidechain and sidechain.

The most preferred use of the nanoparticle-containing organocopolymers is in architectural coating compositions. By architectural coating compositions are meant paints intended both for application directly on the building, both inside and outside, and paints to be applied to ancillary structures of buildings, such as outside systems in the wider sense if desired; that is, in the case of outside systems, on verandahs, patios, railings and on site enclosures or fencing, including agricultural fencing. This also includes the coating of unassembled building materials, such as bricks, including sand-lime bricks or concrete bricks. Such coatings may be porous or film-forming. The most widespread substrates are those of mineral nature, and wood. In addition, for example, metal and plastics can be used as substrates.

In the building material coating composition the nanoparticle-containing organocopolymer acts as a binder. A synergistic reinforcement of the properties of the organic polymer and of the silicon-based component is observed. In other words, as well as the high binding power and high-grade mechanical properties of the polymer, the resistance properties of the silicon component are typically found. In particular these architectural coating compositions are distinguished by the fact that they produce coatings having significantly improved anti-blocking behaviour and hence a reduced soiling tendency. When using the nanoparticle-containing organocopolymer dispersion binders of the invention, the incompatibilities, inhomogeneous distributions or subsequent phase separation and domain formation that are possible in the case of mere physical mixtures of nanoparticle-containing architectural coatings do not occur. Furthermore, the anticipated properties, such as high storage stability and weathering stability and very good water resistance, are found. With hydrophobically formulated copolymers it is possible to realise porous coatings having a pigment volume concentration above the critical pigment volume concentration and distinguished by high gas permeability and water vapour permeability in conjunction with a high level of water repellency. As a result of the incorporation by copolymerization into the copolymer of silanes which contain hydrolysable and condensable groups, binders can be prepared which, following application, are moisture-curing, thereby allowing the adjustment of film hardnesses, thermoplasticity, and the soiling tendency. The architectural coating materials are used preferably on substrates comprising mineral substances, and on wood.

The architectural coating compositions may also include auxiliaries:

Examples of auxiliaries are surfactants (C), for which anionic surfactants, nonionic surfactants, cationic surfactants or ampholytic surfactants are suitable.

Further auxiliaries are pigments (D), examples being earth pigments, such as chalk, ochre, umber, green earth, mineral pigments, such as titanium dioxide, chromium yellow, minium, zinc yellow, zinc green, cadmium red, cobalt blue, organic pigments, such as sepia, Cassel brown, indigo, azopigments, anthraquinonoid pigments, indigoid pigments, dioxazine pigments, quinacridone pigments, phthalocyanine pigments, isoindolinone pigments and alkali blue pigments.

The architectural coating compositions may further comprise additives (E). Additives (E) are, for example, biocides, thickeners, alkyl orthotitanates, alkylboric esters, pigment wetting agents and dispersants, antifoams, anti-corrosion pigments, further metal oxides which are not identical with the pigment (D) and are not anti-corrosion pigments, metal carbonates, and organic resins.

The nanoparticle-containing organocopolymer dispersions of the invention can be added during the operation of preparing the architectural coating compositions in the course of different operating steps. They can be added, for example, to the millbase, as is typical for silicone resin binders, or they are added during the letdown operation, as is typical, instead, for dispersions of organic polymers.

The architectural coating compositions contain preferably 1% to 90% by weight, more preferably 4% to 70% by weight, of the nanoparticle-containing organocopolymer dispersions.

The architectural coating compositions contain preferably 0.1% to 10% by weight, more preferably 0.5% to 5% by weight, of surfactant (C).

The architectural coating compositions contain preferably 0.5% to 40% by weight, more preferably 2% to 35% by weight, in particular 5% to 30% by weight, of pigment (D).

The architectural coating compositions contain preferably 10% to 70% by weight, more preferably 15% to 65% by weight, in particular 20% to 60% by weight of water.

The architectural coating compositions contain preferably 0.1% to 60% by weight, more preferably 1% to 50% by weight, in particular 10% to 40% by weight of additives (E).

The fractions in percent by weight are based in each case on the total weight of the architectural coating composition.

EXAMPLES

Examples Relating to the Preparation of Methacrylic-functional Particles

Silicone Resins: Method 1—Equilibration

By a common method the toluenic solution of an organopolysiloxane resin and of an α-methacrylatomethylsilane (e.g. methacrylatomethyldimethylmethoxysilane, methacrylatomethylmethyldimethoxysilane, methacrylatomethyltrimethoxysilane) was reacted in the presence of an acidic catalyst such as p-toluenesulphonic acid or of an acidic phyllosilicate as obtainable, for example, under the brand name Tonsil® Optimum FF from Süd-Chemie. Following filtration and neutralization of the catalyst the solvent was evaporated.

Silicone Resins: Method 2—Cohydrolysis

By a common method a mixture of hexamethyldisiloxane, an α-methacrylatomethylsilane (e.g. methacrylatomethyldimethylmethoxysilane, methacrylatomethylmethyldimethoxysilane, methacrylatomethyltrimethoxysilane) and tetraethoxysilane was hydrolysed in the presence of aqueous HCl. Following addition of toluene, neutralization with NaOH and filtration to remove the precipitated NaCl, the solvent was evaporated.

$SiO_2$ Particles—Version 1:

20 g of an $SiO_2$ organosol (IPA-ST® from Nissan Chemicals, 30% by weight $SiO_2$, 12 nm) were admixed dropwise over the course of 1 minute with 2 g of methacrylatomethyldimethylmethoxysilane and the mixture was heated at 60° C. for 16 h. After the mixture had cooled to room temperature, 15 g of butyl acrylate were added and then the isopropanol was distilled off under reduced pressure. The transparent dispersion contained 29% by weight of $SiO_2$.

$SiO_2$ Particles—Version 2:

20 g of an aqueous $SiO_2$ sol (LUDOX® AS 40 from Grace Davison, 40% by weight $SiO_2$, pH=9.1, 22 nm) were admixed dropwise over the course of 60 minutes with 20 ml of ethanol and, over the course of 5 minutes, 2 g of methacrylatomethyltrimethoxysilane and the mixture was heated at 60° C. for 16 h. After the mixture had cooled to room temperature, 15 g of styrene were added and then ethanol and water as an azeotrope was distilled off. The transparent dispersion contained 35% by weight of $SiO_2$.

The preparation of the dispersions of the invention is described below. All reactions took place at atmospheric pressure under a nitrogen atmosphere.

Particles employed were as follows:

| Name | Silane (α-Si) | Particles (B) | (α-Si/B) |
|---|---|---|---|
| Particle 1 | α-Methacryloyloxy-methyldimethylmono-methoxysilane | Methylsilicone resin (D/T = 3/97); residual OR: 4.8% | 1/10 |
| Particle 2 | α-Methacryloyloxy-methyldimethylmono-methoxysilane | Methylsilicone resin (M/Q = 39/61); residual OR: 3.4% | 1/10 |
| Particle 3 | α-Methacryloyloxy-methyldimethylmono-methoxysilane | Nano-$SiO_2$ Particle size 5-20 nm | 1/10 |
| Particle 4 | α-Methacryloyloxy-methyldimethylmono-methoxysilane | Fumed silica WACKER HDK T30 | 1/10 |
| Particle 5 | α-Methacryloyloxy-methyl-dimethylmono-methoxysilane | Phenylsilicone resin (D/T = 37/63) | 1/10 |
| Particle 6 | α-Methacryloyloxy-methyl-dimethyltri-methoxysilane | Methylsilicone resin (M/Q = 39/61); residual OR: 3.4% | 1/10 |
| Particle 7 | Vinyldimethylmethoxy silane | SILRES® H62A | 1/10 |
| Particle 8 | α-Methacryloyloxy-dimethyltrimethoxy-silane | Methylsilicone resin (M/Q = 39/61); residual OR: 3.4% | 1/20 |

Examples Relating to the Preparation of the Copolymers by Means of Emulsion Polymerization Example 1 (20% by Weight of Particle 1; styrene/n-butyl acrylate 1/2)

In a 1000 ml polymerization vessel with anchor stirrer
7.2 g n-butyl acrylate
3.8 g styrene
93.7 g water
1.2 g acrylic acid
0.4 g sodium dodecyl sulphate
0.1 g sodium vinylsulphonate
10 mg each iron(II) sulphate and disodium EDTA were adjusted to a pH of 6.5 and heated with stirring (200 rpm) at 40° C. (initial charge).

In a first vessel (feed 1a) a 10% strength by weight aqueous solution of tert-butyl hydroperoxide was prepared.

In a second vessel (feed 1b) a 5% strength by weight aqueous solution of sodium hydroxymethanesulphinate was prepared.

In a third vessel (feed 2) an emulsion was prepared from
190.3 g water
3.6 g acrylic acid
24.0 g particle 1
13.3 g sodium dodecyl sulphate
65.5 g n-butyl acrylate
34.3 g styrene.

Particle 1 was first dissolved fully in the organic monomer and then emulsified.

Feeds 1a and 1b were started, with a metering rate of 105 μl/min, and the initial charge was polymerized at 40° C. for 20 minutes. Then feed 2 was started, with a metering rate of 4 ml/min, and the monomer emulsion was metered in continuously over the course 165 minutes. After the end of metering (feed 2) the metering of TBHP and Brüggolit was continued for an hour. The dispersion was then cooled to room temperature.

Dispersion Analysis:

Solids content: 32%, pH: 6.5; Brookfield viscosity 20 (spindle 4): 1740 mPas; glass transition temperature $T_g$: 54° C.; (Nanosizer) Coulter: average particle size: 135/77 nm; PDI: 1.45; surface area 58.7 $m^2$/g; filming of polymer: after drying by evaporation of water: smear- and tack-free film, no exudation of silicone; dispersion film has elastic properties. TEM micrografts (ultramicrotome section) of the film show a homogeneous distribution of the silicone in the matrix, with silicone domains in the size orders 50-400 nm.

Similarly, the formulas below were used to prepare the following copolymer dispersions, which have the following analytical data:

Example 2 (10% by Weight Particle 1; styrene/n-butyl acrylate 1/2)

Initial charge 7.2 g n-butyl acrylate
93.7 g water
0.4 g sodium dodecyl sulphate
10 mg each of iron(II) sulphate and EDTA
3.8 g styrene
1.2 g acrylic acid
0.1 g sodium vinylsulphonate
Feed 1a 10% solution of tert-butyl hydroperoxide in $H_2O$
Feed 1b 5% solution of sodium hydroxymethanesulphinate in $H_2O$
Feed 2

190.3 g water
22.3 g particle 1
65.5 g n-butyl acrylate
3.6 g acrylic acid
13.3 g sodium dodecyl sulphate
34.3 g styrene Solids content: 29%, pH: 7.1; Brookfield viscosity 26: 0.0038 Pas; (Nanosizer) Coulter: average particle size: 270 nm; PDI: 3.2; surface area 55.29 m$^2$/g; filming of the polymer: after drying by evaporation of the water: smear- and tack-free film, no exudation of silicone Example 3 (10% by Weight Particle 1; MMA/n-butyl acrylate 1/1)

Initial charge 16.6 g n-butyl acrylate
102.3 g water
0.4 g sodium dodecyl sulphate
10 mg each of Fe(II) sulphate and EDTA
16.6 g methyl methacrylate
1.8 g acrylic acid
0.16 g sodium vinylsulphonate
Feed 1a 10% solution of tert-butyl hydroperoxide in $H_2O$
Feed 1b 5% solution of sodium hydroxymethanesulphinate in $H_2O$
Feed 2

207.7 g water
38.0 g particle 1
149.9 g n-butyl acrylate
5.5 g acrylic acid
13.6 g sodium dodecyl sulphate
149.9 g methyl methacrylate Solids content: 45%, pH: 7.5; Brookfield viscosity 41: 0.0037 Pas; glass transition temperature $T_g$: 52° C.; (Nanosizer) Coulter: average particle size: 270/80 nm (bimodal); surface area 49.74 m$^2$/g; filming of the polymer: after drying by evaporation of the water: smear- and tack-free film, no exudation of silicone Example 4 (10% by Weight Particle 2, MMA/n-butyl acrylate 1/1)

Initial charge 16.6 g MMA
92.4 g water
0.4 g sodium dodecyl sulphate
10 mg each of Fe(II) sulphate and EDTA
16.6 g n-butyl acrylate
1.8 g acrylic acid
0.16 g sodium vinylsulphonate
Feed 1a 10% solution of tert-butyl hydroperoxid in $H_2O$
Feed 1b 5% solution of sodium hydroxymethanesulphinate in $H_2O$
Feed 2

187.6 g water
13.3 g sodium dodecyl sulphate
149.9 g n-butyl acrylate
5.5 g acrylic acid
38.0 g particle 2
149.9 g MMA Solids content: 50.8%, pH: 8.1; Brookfield viscosity 48: 0.103 Pas; glass transition temperature $T_g$: 54° C.; (Nanosizer) Coulter: average particle size: 285 nm; PDI: 1.2; surface area 22.43 m$^2$/g; filming of the polymer: after drying by evaporation of the water: smear- and tack-free film, no exudation of silicone. TEM micrographs: Si particle domains in the range 50-700 nm.

Example 5 (20% by Weight Particle 2; MMA/n-butyl acrylate 1/1)

Initial charge 16.6 g MMA
92.4 g water
0.4 g sodium dodedcyl sulphate
10 mg each of Fe(II) sulphate and EDTA
16.6 g n-butyl acrylate
1.8 g acrylic acid
0.16 g sodium vinylsulphonate
Feed 1a 10% solution of tert-butyl hydroperoxide in $H_2O$
Feed 1b 5% solution of sodium hydroxymethanesulphinate in $H_2O$
Feed 2

187.6 g water
13.3 g sodium dodecyl sulphate
149.9 g n-butyl acrylate
5.5 g acrylic acid
76.0 g particle 2
149.9 g MMA Solids content: 49%, pH: 7.9; Brookfield viscosity 45: 0.049 Pas; glass transition temperature $T_g$: 53° C.; (Nanosizer) Coulter: average particle size: 262 nm; PDI: 1.1; surface area 26.07 m$^2$/g; filming of the polymer: after drying by evaporation of the water: smear- and tack-free film no exudation of silicone. TEM micrographs: Si particle domains in the range 50-700 nm.

Example 6 (30% by Weight Particle 2, MMA/n-butyl acrylate 1/1)

Initial charge 10 g MMA
82.4 g water
0.2 g sodium dodecyl sulphate
10 mg each of Fe(II) sulphate and EDTA
10 g n-butyl acrylate
1.4 g acrylic acid
0.12 g sodium vinylsulphonate
Feed 1a 10% solution of tert-butyl hydroperoxide in $H_2O$
Feed 1b 5% solution of sodium hydroxymethanesulphinate in $H_2O$
Feed 2

167.5 g water
8.2 g sodium dodecyl sulphate
89.6 g n-butyl acrylate
4.1 g acrylic acid
85.0 g particle 2
89.6 g MMA Solids content: 48%, pH: 7.7; Brookfield viscosity 48: 0.103 Pas; glass transition temperature $T_g$: 54° C.; (Nanosizer) Coulter: average particle size: 346 nm; surface area 30.13 m²/g; filming of the polymer: after drying by evaporation of the water: smear- and tack-free film, no exudation of silicone. TEM micrographs: Si particle domains in the range 50-700 nm.

Example 7 (10% by Weight Particle 3, MMA/n-butyl acrylate 1/1)

Initial charge 16.6 g MMA
102.3 g water
0.4 g sodium dodecyl sulphate
10 mg each of Fe(II) sulphate and EDTA
16.6 g n-butyl acrylate
2.0 g acrylic acid
0.16 g sodium vinylsulphonate
Feed 1a 10% solution of tert-butyl hydroperoxide in $H_2O$
Feed 1b 5% solution of sodium hydroxymethanesulphinate in $H_2O$
Feed 2

207.7 g water
13.6 g sodium dodecyl sulphate
149.4 g n-butyl acrylate
5.9 g acrylic acid
38.0 g particle 3
149.4 g MMA Solids content: 46%, pH: 8.1; Brookfield viscosity 46: 0.116 Pas; glass transition temperature $T_g$: 54° C.; (Nanosizer) Coulter: average particle size: 150 nm; surface area 42.49 m²/g; filming of the polymer: after drying by evaporation of the water: smear- and tack-free film, no exudation of silicone. TEM micrographs: nano-$SiO_2$ is retained in its identity.

Example 8 (5% by Weight Particle 4, MMA/n-butyl acrylate 1/1)

In this case the material in its entirety was introduced as an initial charge and only the initiator solutions were metered in.

Initial charge 109.2 g MMA
580 g water
16 g sodium dodecyl sulphate
10 mg each of Fe(II) sulphate and EDTA
109.2 g n-butyl acrylate
8.0 g acrylic acid
0.12 g sodium vinylsulphonate
11.3 g particle 4
Feed 1a 10% solution of tert-butyl hydroperoxide in $H_2O$
Feed 1b 5% solution of sodium hydroxymethanesulphinate in $H_2O$ Solids content: 26%, pH: 8.1; Brookfield viscosity 44: 0.0075 Pas; (Nanosizer) Coulter: average particle size: 106 nm, 1 μm (bimodal); surface area 374 m²/g; filming of the polymer: after drying by evaporation of the water: tack-free film, bitty regions apparent.

Example 9 (10% by Weight Particle 5, MMA/n-butyl acrylate 1/1)

Initial charge 13.3 g MMA
85.8 g water
0.3 g sodium dodecyl sulphate
10 mg each of Fe(II) sulphate and EDTA
13.3 g n-butyl acrylate
1.5 g acrylic acid
0.12 g sodium vinylsulphonate
Feed 1a 10% solution of tert-butyl hydroperoxide in $H_2O$
Feed 1b 5% solution of sodium hydroxymethanesulphinate in $H_2O$
Feed 2

174.2 g water
10.7 g sodium dodecyl sulphate
119.7 g n-butyl acrylate
4.5 g acrylic acid
29.6 g particle 5
119.7 g MMA Solids content: 47%, pH: 7.5; Brookfield viscosity 18: 0.056 Pas; glass transition temperature $T_g$: 49° C. (Nanosizer) Coulter: average particle size: 108 nm, 400 nm, 4 μm (trimodal); surface area 27.23 m²/g; filming of the polymer: after drying by evaporation of the water: tack-free film.

Example 10 (20% by Weight Particle 5, MMA/n-butyl acrylate 1/1)

Initial charge 8.0 g MMA
57.4 g water
0.2 g sodium dodecyl sulphate
10 mg each of Fe(II) sulphate and EDTA
8.0 g n-butyl acrylate
0.9 g acrylic acid
0.07 g sodium vinylsulphonate
Feed 1a 10% solution of tert-butyl hydroperoxide in H₂O
Feed 1b 5% solution of sodium hydroxymethanesulphinate in H₂O
Feed 2

116.6 g water
10.7 g sodium dodecyl sulphate
72 g n-butyl acrylate
2.7 g acrylic acid
39.9 g particle 5
72 g MMA Solids content: 46%, pH: 7.8; Brookfield viscosity 38: 0.0105 Pas; glass transition temperature $T_g$: 48° C. (Nanosizer) Coulter: average particle size: 240 nm, 6 µm (bimodal); surface area 27.23 m²/g; filming of the polymer: after drying by evaporation of the water: tack-free film.

Example 11 (10% by Weight Particle 6, MMA/n-butyl acrylate 1/1)

Initial charge 11.6 g MMA
67.7 g water
0.3 g sodium dodecyl sulphate
10 mg each of Fe(II) sulphate and EDTA
11.6 g n-butyl acrylate
1.3 g acrylic acid
0.10 g sodium vinylsulphonate
Feed 1a 10% solution of tert-butyl hydroperoxide in H₂O
Feed 1b 5% solution of sodium hydroxymethanesulphinate in H₂O
Feed 2

137.4 g water
9.5 g sodium dodecyl sulphate
104.6 g n-butyl acrylate
3.8 g acrylic acid
12.7 g particle 6
104.6 g MMA Solids content: 45%, pH: 8.0; Brookfield viscosity 18: 0.0326 Pas; (Nanosizer) Coulter: average particle size: 360 nm; surface area 17.41 m²/g; filming of the polymer: after drying by evaporation of the water: tack-free film.

Examples Relating to the Preparation of Copolymers by Means of Miniemulsion Polymerization

Example 12 (9% Particle 1, n-butyl acrylate/styrene 1/1)

In two separate vessels
10.0 g n-butyl acrylate,
10 g styrene,
600 mg hexadecane,
and 1 g particle 1
and also
160 g deionized water,
1000 mg SDS and
400 mg potassium peroxodisulphate are dissolved and the two solutions are then combined. With stirring and ice cooling the emulsion is treated with ultrasound for 20 minutes. The miniemulsion formed is then polymerized at 80° C. in a 500 ml polymerization reactor for 4 h. Solids content: 12%, pH: 7.2; Coulter: average particle size: 62 nm, surface area 98.67 m²/g; filming of the polymer: after drying by evaporation of the water: tack-free film.

The following dispersions were prepared similarly:

Example 13 (10% Particle 2, MMA/n-butyl acrylate 1/1)

Formula 10 g MMA
160 g water
1000 mg sodium dodecyl sulphate
400 mg potassium peroxodisulphate
10 g n-butyl acrylate
2 g particle 2
1000 mg hexadecane Solids content: 12%, pH: 7.2; Coulter: average particle size: 64 nm, surface area 86.65 m²/g; filming of the polymer: after drying by evaporation of the water: tack-free film.

Example 14 (20% Particle 2, MMA/n-butyl acrylate 1/1)

Formula 10 g MMA
160 g water
1000 mg sodium dodecyl sulphate
400 mg potassium peroxodisulphate
10 g n-butyl acrylate
5 g particle 2
1000 mg hexadecane Solids content: 14%, pH: 7.4; Coulter: average particle size: 71 nm, surface area 87.61 m²/g; filming of the polymer: after drying by evaporation of the water: tack-free film.

Example 15 (30% Particle 2, MMA/n-butyl acrylate 1/1)

| Formula |
| --- |
| 10 g MMA |
| 160 g water |
| 1000 mg sodium dodecyl sulphate |
| 400 mg potassium peroxodisulphate |
| 10 g n-butyl acrylate |
| 8 g particle 2 |
| 1000 mg hexadecane |

Solids content: 15%, pH: 7.2; Coulter: average particle size: 80 nm/1 μm (bimodal), surface area 60.13 m²/g; filming of the polymer: after drying by evaporation of the water: tack-free film.

Example 16 (10% Particle 3, MMA/n-butyl acrylate 1/1)

| Formula |
| --- |
| 10 g MMA |
| 160 g water |
| 1000 mg sodium dodecyl sulphate |
| 400 mg potassium peroxodisulphate |
| 10 g n-butyl acrylate |
| 2 g particle 3 |
| 1000 mg hexadecane |

Solids content: 12%, pH: 7.1; Coulter: average particle size: 67 nm, surface area 92.58 m²/g; filming of the polymer: after drying by evaporation of the water: tack-free film.

Example 17 (10% Particle 1, MMA/n-butyl acrylate 1/1)

| Formula |
| --- |
| 10 g MMA |
| 160 g water |
| 3000 mg 20% PVOH solution |
| Degree of hydrolysis 88 mol % |
| Höppler viscosity 4 mPas |
| 400 mg potassium peroxodisulphate |
| 10 g n-butyl acrylate |
| 2 g particle 1 |
| 1000 mg hexadecane |

Solids content: 12%, pH: 7.1; Coulter: average particle size: 86 nm/>1 μm (multimodal), surface area 13.24 m²/g; filming of the polymer: after drying by evaporation of the water: tack-free film.

Example 18 (20% Particle 1, MMA/n-butyl acrylate 1/1)

| Formula |
| --- |
| 10 g MMA |
| 160 g water |
| 1000 mg sodium dodecyl sulphate |
| 400 mg potassium peroxodisulphate |
| 10 g n-butyl acrylate |
| 5 g particle 1 |
| 1000 mg hexadecane |

Solids content: 14%, pH: 7.2; Coulter: average particle size: 70 nm, surface area 88.69 m²/g; filming of the polymer: after drying by evaporation of the water: tack-free film. TEM micrographs of the film (ultramicrotome section): Si domains in the size order 10-50 nm.

Example 19 (10% Particle 2, 1% Particle 4, MMA/n-butyl acrylate/styrene 1/1/0.1)

| Component | Mass [g] |
| --- | --- |
| Water | 303.00 |
| SDS | 15.00 |
| Na vinylsulphonate | 1.00 |
| Acrylic acid | 1.00 |
| Butyl acrylate | 40.00 |
| MMA | 40.00 |
| Styrene | 4.00 |
| Particle 4 | 2.00 |
| Particle 2 | 10.00 |
| Hexadecane | 1.00 |
| Potassium persulphate (water) | 1.25 |

Solids content: 29%, pH: 2.6; filming of the polymer: after drying by evaporation of the water: tack-free film.

Example 20 (10% Particle 6, MMA/n-butyl acrylate/styrene 2/3/0.22)

| Component | Mass [g] |
| --- | --- |
| Water | 165.90 |
| SDS | 5.00 |
| Na vinylsulphonate | 0.30 |
| Acrylic acid | 0.20 |
| Butyl acrylate | 90.00 |
| MMA | 62.00 |
| Styrene | 10.00 |
| Particle 6 | 18.00 |
| Hexadecane | 3.25 |
| Potassium persulphate | 0.80 |
| NaHCO$_3$ (water) | 0.25 |

Solids content: 49%, pH: 4.5; filming of the polymer: after drying by evaporation of the water: tack-free film.

Example 21 (10% Particle 3, MMA/n-butyl acrylate/styrene 2/3/0.22)

| Component | Mass [g] |
|---|---|
| Water | 165.90 |
| SDS | 5.00 |
| Na vinylsulphonate | 0.30 |
| Acrylic acid | 0.20 |
| Butyl acrylate | 90.00 (44 g sol) |
| MMA | 62.00 |
| Styrene | 10.00 |
| Particle 3 (29% in BA) | 18.00 (62 g sol) |
| Hexadecane | 3.25 |
| Potassium persulphate | 0.80 |
| NaHCO$_3$ (water) | 0.25 |

Solids content: 49%, pH: 4.5; filming of the polymer: after drying by evaporation of the water: transparent tack-free film.

Examples Relating to the Preparation of Copolymers by Means of Suspension Polymerization:

Example 22 (40% Particle 7, Vinyl Acetate)

A 20 litre pressure autoclave was initially charged with 1.17 kg of water, 2.78 kg of Polyviol W 25/140 (polyvinyl alcohol, 10% strength by weight solution), 47.25 g of Genapol X 050 (100% strength by weight), 120.28 g of Texapon K12 (10% strength by weight aqueous solution), 4.36 g of sodium acetate, 555.83 g of vinyl acetate, 2220 g of particle 7 and 58.51 g of Trigonox 23 (tertiary-butyl peroxyneodecanoate, TBPND, 95% strength by weight in aliphatics—oil-soluble initiator). 10% strength by weight formic acid was used to adjust the pH to 5. Additionally 10 ml of Trilon B (EDTA; 2% strength by weight aqueous solution) and 31 ml of ammonium iron sulphate (1% strength by weight solution) were added. The vessel was heated to 70° C. and 8 bar of nitrogen were injected. The initial charge was polymerized initially for 30 minutes. After these 30 minutes an 11.2% strength by weight tert-butyl hydroperoxide (TBHP) solution was run in at 116 g per hour and a 2.0% strength by weight Brüggolit solution at 326 g per hour. At the same time the metered addition was commenced of 2.78 kg of vinyl acetate, at a rate of 1390 g per hour (monomer feed). Immediately thereafter the two emulsifier feeds were run in. The Texapon feed contained 111.17 g of water and 481.12 g of Texapon K12 (10% strength by weight aqueous solution) and was metered in at a rate of 297 g/h. The Genapol feed contained 188.98 g of Genapol X050 (100% strength by weight) and was metered in at a rate of 95 g/h. The total metering time for the monomer feed and the emulsifier feeds was 2 hours. After the end of the monomer feed or emulsifer feed the TBHP and Brüggolit feed was continued for one hour. After the autoclave had been let down the dispersion was treated with steam ("stripped") in order to minimize residual monomer and then preserved using Hydrorol W.

Dispersion Analyses:
Solids content: 48.87%, pH: 5.47; Brookfield viscosity 20 (spindle 4): 1740 mPas; glass transition temperature Tg: 26.2° C.; average particle size: 5022.2 nm (Nanosizer) Coulter: Dn 0.107; Dv 8.422; surface area 7.80 m$^2$; smear- and tack-free film, no exudation of silicone; dispersion film has elastic properties.

Example 23 (15% Particle 7, Vinyl Acetate)

A 20 litre pressure autoclave was charged with 1.19 kg of water, 2.83 kg of Polyviol W 25/140 (polyvinyl alcohol, 10% strength by weight solution), 48.14 g of Genapol X 050 (100% strength by weight), 122.55 g of Texapon K12 (10% strength by weight aqueous solution), 4.44 g of sodium acetate, 566.32 g of vinyl acetate, 849.47 g of particle 7 and 59.61 g of Trigonox 23 (tertiary-butyl peroxyneodecanoate, TBPND, 95% strength by weight in aliphatics—oil-soluble initiator). 10% strength by weight formic acid was used to adjust the pH to 5. Additionally 10 ml of Trilon B (EDTA; 2% strength by weight aqueous solution) and 31 ml of ammonium iron sulphate (1% strength by weight solution) were added. The vessel was heated to 70° C. and 8 bar of nitrogen were injected. The initial charge was polymerized initially for 30 minutes. After these 30 minutes an 11.2% strength by weight tert-butyl hydroperoxide (TBHP) solution was run in at 118 g per hour and a 2.0% strength by weight Brüggolit solution at 332 g per hour. At the same time the metered addition was commenced of 4.25 kg of vinyl acetate, at a rate of 2125 g per hour (monomer feed).

Immediately thereafter the two emulsifier feeds were run in. The Texapon feed contained 113.26 g of water and 490.2 g of Texapon K12 (10% strength by weight aqueous solution) and was metered in at a rate of 302 g/h. The Genapol feed contained 192.55 g of Genapol X050 (100% strength by weight) and was metered in at a rate of 96 g/h. The total metering time for the monomer feed and the emulsifier feeds was 2 hours.

After the end of the monomer feed or emulsifer feed the TBHP and Brüggolit feed was continued for one hour. After the autoclave had been let down the dispersion was treated with steam ("stripped") in order to minimize residual monomer and then preserved using Hydrorol W.

Dispersion Analyses:
Solids content: 49.81%, pH: 5.37; Brookfield viscosity 20 (spindle 4): 1875 mPas; glass transition temperature Tg: 22.9° C.; average particle size: 716.6 nm (Nanosizer) Coulter: Dn 0.273; Dv 4.063; surface area 6.22 m$^2$; smear- and tack-free film, no exudation of silicone; dispersion film has elastic properties.

Examples 24 to 28

In two 1000 ml vessels, in accordance with the data in table 1, the fractions of the oil (O) phase and water (W) phase, each separately, were homogenized by stirring. Then oil phase and water phase were combined and homogenized in one pass through an ultra-high-pressure homogenizer from Avestin at pressures between 400 and 800 bar. The resulting miniemulsion was transferred to a jacketed, thermostatable 1000 ml polymerization reactor with anchor stirrer and heated to 40° C. with stirring. Reaction was initiated by addition of the reducing agent feed (5% strength solution of sodium formaldehyde-sulphoxylate in deionized water, metering rate 105 µl/min). The course of the polymerization was monitored by means of gravimetry. The polymerization was typically at an end after 5 hours.

The amounts for the reaction components of examples 24 to 28 are each given as mass percentages.

(O): oil phase; (W): water phase.

Particle P is a methylsilicone resin of 61% M units and 39% Q units whose surface area is populated with methacryloylmethyl groups and prepared in accordance with method 1 above.

TABLE 1

| Component | 24 | 25 | 26 | 27 | 28 |
|---|---|---|---|---|---|
| Water (W) | 70.08 | 68.19 | 50.02 | 49.97 | 50.45 |
| Na lauryl sulphate (W) | 2.77 | 2.70 | 1.03 | 1.03 | 1.01 |
| Na vinylsulphonate (W) | 0.28 | 0.27 | — | — | — |
| Acrylic acid (W) | 0.28 | 0.27 | — | — | — |
| Ammonium persulphate (W) | 0.28 | 0.27 | 0.30 | 0.39 | 0.62 |
| Na hydrogencarbonate (W) | — | — | 0.08 | 0.08 | 0.10 |
| Butyl acrylate (O) | 11.08 | 10.78 | 20.61 | 20.59 | 17.15 |
| Methyl methacrylate (O) | 11.08 | 10.78 | 18.19 | 18.17 | 15.74 |
| Butyl methacrylate (O) | — | — | — | 3.03 | 4.04 |
| Styrene (O) | 1.11 | 1.08 | 3.03 | — | 2.42 |
| Particle P (O) | 2.77 | 5.39 | 5.15 | 5.15 | 5.05 |
| Methacrylatomethyl-triethoxysilane (O) | — | — | 0.61 | 0.61 | 0.92 |
| Cetyl alcohol (O) | 0.28 | 0.27 | 0.99 | 0.98 | 0.92 |

The resulting dispersions had the following analytical properties (table 2):

TABLE 2

| Properties | 24 | 25 | 26 | 27 | 28 |
|---|---|---|---|---|---|
| Solids content [%] | 29 | 29 | 46 | 45 | 48 |
| Particle size [nm] | 120 | 120 | 160 | 135 | 117 |
| PDI [Dw/Dn] | 1.43 | 1.55 | 1.11 | 1.13 | 1.60 |
| Viscosity [mPas 50 s$^{-1}$] | 3.8 | 4.0 | 7.7 | 19 | 13 |
| Tg [° C.] | 27 | 30 | 33 | 32 | 33 |

Application Examples

Architectural Coating Compositions

In the application examples which follow, all parts and percentages are by weight unless indicated otherwise.

Example 29

Architectural Coating Composition

The nanoparticle-containing organocopolymer dispersion used in this example was that from example 4 (methylsilicone resin with an M:Q ratio of 39:61, α-methacrylatosilane-functional, copolymerized with butyl acrylate and methyl methacrylate to a copolymer, nanoparticle content 10% by weight based on binder).

In a commercial high-speed stirrer for producing aqueous architectural coatings the following components were mixed in this order:
184 parts by weight water
10 parts by weight acrylate thickener
5 parts by weight pigment dispersant
255 parts by weight titanium dioxide pigment
520 parts by weight nanoparticle-containing organocopolymer dispersion
2 parts by weight antimicrobial preservative
20 parts by weight film-forming assistant
2 parts by weight 30% strength by weight aqueous ammonia solution
2 parts by weight antifoam preparation composed of mineral oil, paraffin and silicone oil
Result: 1000 parts by weight architectural coating.

Example 30

Architectural Coating Composition

The nanoparticle-containing organocopolymer dispersion used in this example was that from example 5 (nanoparticles: methylsilicone resin with an M:Q ratio of 39:61, α-methacrylatosilane-functional, copolymerized with butyl acrylate and methyl methacrylate to a copolymer, nanoparticle content 20% by weight based on binder).

In a commercial high-speed stirrer for producing aqueous architectural coatings the following components were mixed in this order:
184 parts by weight water
10 parts by weight acrylate thickener
5 parts by weight pigment dispersant
255 parts by weight titanium dioxide pigment
520 parts by weight nanoparticle-containing organocopolymer dispersion
2 parts by weight antimicrobial preservative
20 parts by weight film-forming assistant
2 parts by weight 30% strength by weight aqueous ammonia solution
2 parts by weight antifoam preparation composed of mineral oil, paraffin and silicone oil
Result: 1000 parts by weight architectural coating.

Example 31

Architectural Coating Composition

The nanoparticle-containing organocopolymer dispersion used in this example was that from example 7 (nanoparticles: nano-SiO$_2$; (particle size 5-20 nm), α-methacrylatosilane-functional, copolymerized with butyl acrylate and methyl methacrylate to a copolymer, nanoparticle content 10% by weight based on binder).

In a commercial high-speed stirrer for producing aqueous architectural coatings the following components were mixed in this order:
184 parts by weight water
10 parts by weight acrylate thickener
5 parts by weight pigment dispersant
255 parts by weight titanium dioxide pigment
520 parts by weight nanoparticle-containing organocopolymer dispersion
2 parts by weight antimicrobial preservative
20 parts by weight film-forming assistant
2 parts by weight 30% strength by weight aqueous ammonia solution
2 parts by weight antifoam preparation composed of mineral oil, paraffin and silicone oil
Result: 1000 parts by weight architectural coating.

Example 32

Architectural Coating Composition

The nanoparticle-containing organocopolymer dispersion used in this example was that from example 4 (nanoparticles: methylsilicone resin with an M:Q ratio of 39:61, α-methacrylatosilane-functional, copolymerized with butyl acrylate and methyl methacrylate to a copolymer, nanoparticle content 10% by weight based on binder).

In a commercial high-speed stirrer for producing aqueous architectural coatings the following components were mixed in this order:

336 parts by weight water
1 part by weight pigment dispersant
2 parts by weight fungicide
5 parts by weight cellulose ether-based thickener
120 parts by weight titanium dioxide pigment
275 parts by weight chalk
60 parts by weight talc
180 parts by weight nanoparticle-containing organocopolymer dispersion
10 parts by weight early water repellency additive*
1 part by weight 30% strength ammonia solution
   Result: 990 parts by weight architectural coating.

*Composition of the early water repellency additive: 55% by weight aqueous emulsion of a condensation product of an α,ω-dihydroxymethylpolysiloxane containing an Si-bonded hydroxyl group in each of the terminal units and N(2-aminoethyl)-3-aminopropyltrimethoxysilane in the presence of KOH, with an amine number of about 0.3, a viscosity of about 1500 mm²/s at 25° C. and a residual methoxy content of less than 5 mol %, based on the methoxy groups initially present in the N-(2-aminoethyl)-3-aminopropyltrimethoxysilane.

A sand-lime brick was coated by brush with 200 g/m² of this silicone resin paint.

Subsequently the water absorption was tested, employing the method described in DIN EN 1062-3 of February 1999. In its uncoated form the sand-lime brick used had a water absorption coefficient after 24 h water storage of $w_{24}$=6.19 kg/(m²h$^{0.5}$). After being coated, the test specimen was dried at room temperature for one week and then stored for 24 h under standard conditions (23° C.±2° C., 50%±5% relative humidity). In deviation from the standard DIN EN 1062-3, conditioning was performed not such that the test specimen was stored for 3 times 24 h in fresh mains water and then dried in each case, but instead such that the test specimen was subjected to the water storage continuously for 72 h, after which the water absorption coefficient was determined in accordance with standard DIN EN 1062-3. The coefficient was $W_{72}$=0.24 kg/(m²h$^{0.5}$). Thereafter the test specimen was dried at 50° C.±5° C. for 24 h and then subjected to a further water absorption test in accordance with standard DIN EN 1062-3, at which point the water absorption figure after 24 h was $w_{24}$=0.10 kg/(m²h$^{0.5}$).

A further sand-lime brick was coated by brush with 200 g/m² of the architectural coating of example 32. After 2 h of drying at room temperature the sand-lime brick was inclined by 45° relative to the horizontal, and water was dripped vertically onto the surface from a pipette. The water droplets bead off spontaneously.

Comparative Example 33

Architectural Coating Composition Produced Using a Silicone Acrylate Dispersion of the Prior Art, According to EP 635 526 B1

The silicone acrylate dispersion according to EP 635 526 B1 was prepared by free-radical emulsion polymerization.

The silicone component used was 20% by weight of a polyorganosiloxane which was alpha,omega-functional, having two different substituents in positions alpha and omega. One of the substituents was a butoxy group corresponding to component X from formula (I) in EP 635 526 B1, and the second substituent was a propyl methacrylate function corresponding to substituent Y in formula (I) in EP 635 526 B1. The polysiloxane between these substituents was a polydimethylsiloxane having an average chain length of 20 (Me)$_2$Si—O units.

The organic monomers for the free-radical polymerization were n-butyl acrylate and methyl methacrylate in a 1:1 ratio.

In a 1000 ml polymerization vessel with anchor stirrer
7.2 g n-butyl acrylate
3.8 g styrene
93.7 g water
1.2 g acrylic acid
0.4 g sodium dodecyl sulphate
0.1 g sodium vinylsulphonate
10 mg each iron(II) sulphate and disodium EDTA were adjusted to a pH of 6.5 and heated with stirring (200 rpm) at 40° C. (initial charge).

In a first vessel (feed 1a) a 10% strength by weight aqueous solution of tert-butyl hydroperoxide was prepared.

In a second vessel (feed 1b) a 5% strength by weight aqueous solution of sodium hydroxymethanesulphinate was prepared.

In a third vessel (feed 2) an emulsion was prepared from
190.3 g water
3.6 g acrylic acid
24.0 g of the above-described monomethacrylatosiloxane
13.3 g sodium dodecyl sulphate
65.5 g n-butyl acrylate
34.3 g styrene.

The above-described monomethacrylatosiloxane was first dissolved fully in the organic monomer and then emulsified. Feeds 1a and 1b were started, with a metering rate of 105 µl/min, and the initial charge was polymerized at 40° C. for 20 minutes. Then feed 2 was started, with a metering rate of 4 ml/min, and the monomer emulsion was metered in continuously over the course of 165 minutes. After the end of metering (feed 2) the metering of TBHP and Brüggolit was continued for an hour. The dispersion was then cooled to room temperature.

Dispersion Analysis:
   Solids content: 32%, filming of polymer: after drying by evaporation of water: smear- and tack-free film, no exudation of silicone.

The dispersion thus obtained was formulated as follows to give an architectural coating composition:

In a commercial high-speed stirrer for producing aqueous architectural coatings the following components were mixed in this order:

184 parts by weight water
10 parts by weight acrylate thickener
5 parts by weight pigment dispersant
255 parts by weight titanium dioxide pigment
520 parts by weight dispersion from this comparative example
2 parts by weight antimicrobial preservative
20 parts by weight film-forming assistant
2 parts by weight 30% strength by weight aqueous ammonia solution
2 parts by weight antifoam preparation composed of mineral oil, paraffin and silicone oil
Result: 1000 parts by weight architectural coating.

Testing for Blocking Resistance:
   The architectural coating compositions of examples 29 to 33 were each applied at 200 g/m² to two pinewood panels with an area of 7.5×15 cm and a thickness of 2 cm which had been dried to a wood moisture content of <10%, and to 2 contrast charts as supplied, for example, by BYK Gardner under order number D 2801 in the 2003/2004 catalogue.

Following paint application the coated wood panels were stored for 7 days at 23° C. and 50%±5% relative humidity. The contrast charts were stored, following paint application, at 60° C. for 4 h in each case. Thereafter the wood panels and contrast charts respectively were each placed on top of one another such that the coated sides of two wood panels and, respectively, the coated sides of two contrast charts came to lie against one another. Stacks of this kind were produced only from contrast charts or wood panels both of which had been coated with the same paint. The stack of charts and the stack of wood panels were each weighted with two 1 kg weights in such a way that the weight acted as uniformly as possible over the area as a whole. The wood panels stack was loaded with a weight for 4 h in each case. Thereafter the wood panels were separated from one another. The ease of separation was evaluated. The evaluation system is a scoring system from 0 to 3:

0 means that the two wood panels were separable from one another easily and without exerting force, with no damage observed to the coatings on the two wood panels.
1 denotes that the panels could be separated only with increased force but without damage to the coating.
2 denotes that the panels were separable only with increased force and, additionally, that there was minor damage, visible to the naked eye, to the coating.
3 denotes that the panels can no longer be separated, or only with very great effort, occasioning considerable damage to the coating.

This test was carried out with the wood panels after storage at different temperatures, the temperatures being 23° C., 30° C., 40° C. and 50° C. The stacks were loaded at the respective temperature with 2 kg of weight for 4 h in each case, after which the ease of separation was assessed, the wood panels being separated from one another while still in the warm state. The stack of contrast charts was likewise loaded with 2 kg of weight, the loading time being 24 h and taking place only at 23° C. Here again the ease of separation was assessed, using the same evaluation system as described above for the wood panels.

The table below gives an overview of the blocking values achieved on the wood panels and with the contrast charts

| Example | Contrast charts | Wood panel 23° C. | Wood panel 30° C. | Wood panel 40° C. | Wood panel 50° C. |
|---|---|---|---|---|---|
| Ex. 29 | 0 | 0 | 0 | 1 | 1 |
| Ex. 30 | 0 | 0 | 0 | 1 | 1 |
| Ex. 31 | 0 | 0 | 0 | 0 | 0 |
| Ex. 32 | 0 | 0 | 0 | 0 | 0 |
| Comp. Ex. 33 | 2 | 1 | 1 | 2 | 2 |

Example 34

Architectural Coatings with Supercritical and with Subcritical PVC

The following two formulas were combined by mixing the constituents with a commercial high-speed rotor/stator mixer to give an architectural coating. In this example the amounts employed are indicated in grams.

|  | Formula 1 | Formula 2 |
|---|---|---|
| Water | 8.75 | 9.48 |
| In-can preservative | 0.06 | 0.07 |
| Film preservative | 0.06 | 0.07 |
| PU thickener | 0.15 | 0.16 |
| Calgon N | 0.06 | 0.07 |
| Silicone antifoam | 0.29 | 0.31 |
| Titanium dioxide pigment | 49.08 | 53.19 |
| Talc | 4.90 | 5.31 |
| Calcium carbonate | 14.71 | 15.94 |
| Potassium methylsiliconate solution |  |  |
| 50% in water | 0.06 | 0.07 |
| Film-forming assistant | 0.87 | 0.94 |
| Dispersion from example 4 | 21.03 | 64.40 |
| Total: | 100.0 | 150.0 |
|  | PVC 65% | PVC 40% |

Formula 1 produced a porous coating, since its pigment volume concentration (PVC) was above the critical PVC. Formula 2 resulted in a closed film.

A sand-lime brick was coated by brush with 200 g/m$^2$ with one each of these architectural paints. Subsequently the water absorption was tested, employing the method described in DIN EN 1062-3 of February 1999. In its uncoated form the sand-lime brick used had a water absorption coefficient after 24 h water storage of $w_{24}$=1.26 kg/(m$^2$h$^{0.5}$).

After being coated, the test specimen was dried at room temperature for one week and then stored for 24 h under standard conditions (23° C.±2° C., 50%±5% relative humidity). In deviation from the standard DIN EN 1062-3, conditioning was performed not such that the test specimen was stored for 3 times 24 h in fresh mains water and then dried in each case, but instead such that the test specimen was subjected to the water storage continuously for 72 h. Thereafter the test specimen was dried at 50° C.±5° C. for 24 h and then subjected to a further water absorption test in accordance with standard DIN EN 1062-3, at which point the water absorption figure after 24 h was $w_{24}$=0.05 kg/(m$^2$h$^{0.5}$) for the coating of formula 1 and $w_{24}$=0.03 kg/m$^2$h$^{0.5}$) for the coating of formula 2.

A further sand-lime brick was coated by brush with 200 g/m$^2$ of one of the architectural coatings of formula 1 or formula 2. After 2 h of drying at room temperature the sand-lime brick was inclined by 45° relative to the horizontal, and water was dripped vertically onto the surface from a pipette. The water droplets ran off but without beading. In a controlled experiment it was shown that the beading effect is achieved if 1 g of an early water repellency additive (as in example 32) is added to each of formulas 1 and 2.

The two architectural coating compositions of formula 1 and formula 2 were subjected to the blocking test as described above, with blocking and damage to the coatings not occurring at any temperature in either case. The coating of formula 1, with the higher PVC, was separable more effectively to a degree than the coating from formula 2, with the lower PVC.

The inventiom claimed is:
1. Copolymers of ethylenically unsaturated monomers and of ethylenically functionalized nanoparticles in the form of their aqueous polymer dispersions or water-redispersible polymer powders, obtained by a process comprising free-radically polymerizing in an aqueous medium and, in the case of redispersible polymer powders, subsequent drying of the resultant polymer dispersion, of A) one or more first monomers selected from the group consisting of vinyl esters, (meth)acrylic esters, vinylaromatics, olefins, 1,3-dienes, vinyl ethers and vinyl halides, and optionally copolymerizing further monomers copolymerizable with said first monomers, in the presence of B) at least one particle composition P having an average diameter of particles of $\leq 1000$ nm, the particles functionalized with ethylenically unsaturated, free-radically polymerizable groups, wherein B1) particles P comprise metal oxides, semimetal oxides, or mixtures thereof, and/or B2) particles P comprise silicone resins comprising repeating units of the formula $[R^4_{(p+z)}SiO_{(4-p-z)/2}]$ (II), each $R^4$ being identical or different and denoting hydrogen, hydroxyl, or alkyl, cycloalkyl, aryl, alkoxy or aryloxy radicals each having up to 18 carbon atoms and being able to be optionally substituted, where for at least 20 mol % of the respective silicone resin p and z are integers from 0 to 3 and p+z=0, 1 or 3, wherein the particles B2) contain radicals $R^4$, where B1) and B2) are each functionalized with one or more $\alpha$-organosilanes of the formula $(R^1O)_{3-n}(R^2)_n Si—(CR^3_2)—X$(I), where $R^1$ is hydrogen, an alkyl radical having 1 to 6 carbon atoms or an aryl radical, $R^2$ and $R^3$ each independently of one another are hydrogen, an alkyl radical having 1 to 12 carbon atoms or an aryl radical, n can be 0, 1 or 2 and X is a radical having 2 to 20 carbon atoms and containing at least one ethylenically unsaturated group, and wherein particles B2) are present in the particle composition P.

2. A copolymer of claim 1, wherein the polymer dispersion or polymer powder additionally comprises up to 30% by weight, based on the total weight of components A) and B), of at least one silane of the formula $(R^5)_{4-m}—Si—(OR^6)_m$(III), where m is a number 1, 2, 3 or 4, $R^5$ is an organofunctional radical selected from the group consisting of alkoxy radicals, aryloxy radicals, phosphonic monoester radicals, phosphonic diester radicals, phosphonic acid radicals, methacryloyloxy radicals, acryloyloxy radicals, vinyl radicals, mercapto radicals, isocyanato radicals, blocked isocyanato radicals, hydroxyl radicals, hydroxyalkyl radicals, epoxy radicals, glycidyloxy radicals, morpholino radicals, piperazino radicals, primary, secondary and tertiary amino radicals having one or more nitrogen atoms, the nitrogen atoms optionally substituted by hydrogen or by monovalent aromatic, aliphatic or cycloaliphatic hydrocarbon radicals, carboxylic acid radicals, carboxylic anhydride radicals, aldehyde radicals, urethane radicals, urea radicals, and mixtures thereof, the radical $R^5$ optionally attached directly to silicon or separated therefrom by a carbon chain of 1 to 6 carbon atoms, and $R^6$ being a monovalent linear or branched aliphatic or cycloaliphatic hydrocarbon radical or a monovalent aromatic hydrocarbon radical or a radical C(=O)—$R^7$, $R^7$ being a monovalent linear or branched aliphatic or a cycloaliphatic hydrocarbon radical or a monovalent aromatic hydrocarbon radical, the at least one silane being present in unhydrolyzed form, partially hydrolyzed form, or fully hydrolyzed form, said at least one silane being a component separate from components A) and B).

3. A copolymer of claim 1, wherein comonomers A) comprise one or more monomers selected from the group consisting of vinyl acetate, vinyl esters of $\alpha$-branched monocarboxylic acids having 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, and 1,3-butadiene.

4. A copolymer of claim 2, wherein comonomers A) comprise one or more monomers selected from the group consisting of vinyl acetate, vinyl esters of $\alpha$-branched monocarboxylic acids having 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, and 1,3-butadiene.

5. A copolymer of claim 1, wherein the $\alpha$-organosilane of the formula $(RO)_{3-}(R^2)_n Si—(CR^3_2)—X$ (I) contains, as radicals $R^1$ and $R^2$ unsubstituted alkyl groups having 1 to 6 carbon atoms; as radical $R^3$, hydrogen; and as radical X, monounsaturated $C_2$ to $C_{10}$ radicals.

6. A copolymer of claim 2, wherein the $\alpha$-organosilane of the formula $(R^1O)_{3-}(R^2)_n Si—(CR^3_2)—X$ (I) contains, as radicals $R^1$ and $R^2$, unsubstituted alkyl groups having 1 to 6 carbon atoms; as radical $R^3$, hydrogen; and as radical X, monounsaturated $C_2$ to $C_{10}$ radicals.

7. A copolymer of claim 3, wherein the $\alpha$-organosilane of the formula $(R^1O)_{3-}(R^2)_n Si—(CR^3_2)—X$ (I) contains, as radicals $R^1$ and $R^2$, unsubstituted alkyl groups having 1 to 6 carbon atoms; as radical $R^3$ hydrogen; and as radical X, monounsaturated $C_2$ to $C_{10}$ radicals.

8. A copolymer of claim 1, wherein particles P comprise particles B1) selected from the group consisting of silicas, and oxides of the metals aluminium, titanium, zirconium, tantallum, tungsten, hafnium, zinc and tin.

9. A copolymer of claim 8, wherein particles B1 comprise colloidal silica, pyrogenic or fumed silica, precipitated silica, or silica sols.

10. A copolymer of claim 1, wherein particles P comprise particles B2) of silicone resins of the formula $[R^4_{(p+z)}SiO_{(4-p-z)/2}]$ composed of at least 30 mol % of Q units wherein p+z is 0.

11. A copolymer of claim 1, wherein particles P comprise particles B2) of silicone resins of the formula $[R^4_{(p+z)}SiO_{(4-p-z)/2}]$ composed of only Q units and M units wherein p+z is 0 and 3.

12. A copolymer of claim 1, wherein particles P comprise particles B2) of silicone resins of the formula $[R^4_{(p+z)}SiO_{(4-p-z)/2}]$.

13. A copolymer of claim 1, wherein the average diameter of the particles P is 1 to 100 nm.

14. A process for preparing a copolymer of claim 1, comprising polymerizing by means of suspension polymerization, emulsion polymerization or miniemulsion polymerization.

15. A process for preparing a copolymer of ethylenically unsaturated monomers and of ethylenically functionalized nanoparticles in the form of their water-redispersible polymer powders of claim 1, comprising polymerizing by means of suspension polymerization, emulsion polymerization or miniemulsion polymerization, and drying of the resultant dispersion by means of spray drying.

16. An architectural coating composition, comprising a copolymer of ethylenically unsaturated monomers and of ethylenically functionalized nanoparticles in the form of their aqueous polymer dispersions or water-redispersible polymer powders of claim 1.

17. A coating, impregnant, or treating agent for textiles, carpeting, floor coverings, films, or moldings, comprising a copolymer of ethylenically unsaturated monomers and of ethylenically functionalized nanoparticles in the form of their aqueous polymer dispersions or water-redispersible polymer powders of claim 1.

18. The copolymer of claim 1, wherein particles P which comprise silicone resins containing only M ($R^4_3SiO_{1/2}$), T($R^4SiO_{3/2}$), and Q ($SiO_{4/2}$) units are present.

19. The copolymer of claim 18, wherein particles P comprise an MQ resin, a T resin, or a mixture thereof.

20. The copolymer of claim 1, wherein the α-organosilane comprises an α-organosilane wherein X is selected from the group consisting of acryloyl, methacryloyl, and mixtures thereof.

21. Copolymers of ethylenically unsaturated monomers and of ethylenically functionalized nanoparticles in the form of their aqueous polymer dispersions or water-redispersible polymer powders, obtained by a process comprising free-radically polymerizing in an aqueous medium and, in the case of redispersible polymer powders, subsequent drying of the resultant polymer dispersion, of A) one or more monomers selected from the group consisting of vinylesters, (meth)acrylic esters, vinylaromatics, olefins, vinyl ethers, and vinyl halides, in the presence of B) at least one particle composition P having an average diameter of particles of 1000 nm, the particles functionalized with ethylenically unsaturated, free-radically polymerizable groups, wherein B1) particles P comprise metal oxides, semimetal oxides, or mixtures thereof, and/or B2) particles P comprise silicone resins comprising repeating units of the formula [$R^4_{(p+z)}SiO_{(4-p-z)/2}$] (II), each $R^4$ being identical or different and denoting hydrogen, hydroxyl, or alkyl, cycloalkyl, aryl, alkoxy or aryloxy radicals each having up to 18 carbon atoms and being able to be optionally substituted, where for at least 20 mol % of the respective silicone resin p and z are integers from 0 to 3 and p+z =0, 1 or 3, wherein the particles B2) contain radicals $R^4$ and where B1) and B2) are each functionalized with one or more α-organosilanes of the formula ($R^1O)_{3-}(R^2)_nSi-(CR^3_2)-X$ (I) where $R^1$ is hydrogen, an alkyl radical having 1 to 6 carbon atoms or an aryl radical, $R^2$ and $R^3$ each independently of one another are hydrogen, an alkyl radical having 1 to 12 carbon atoms or an aryl radical, n can be 0, 1 or 2 and X is a radical having 2 to 20 carbon atoms and containing at least one ethylenically unsaturated group, and wherein the average diameter of the particles B1) is between 1 nm and 100 nm.

22. The copolymer of claim 21, wherein monomer(s) A) are selected from the group consisting of vinyl acetate, vinyl esters of α-branched monocarboxylic acids having 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, and mixtures thereof.

23. The copolymer of claim 1, in the form of a spray dried redispersible polymer powder.

24. The copolymers of claim 1, wherein at least one α-organosilane is an α-organosilane selected from the group consisting of α-(meth)acryloyloxymethylalkoxysilanes.

* * * * *

UNITED STATES PATENT AND TRADEMARK OFFICE
CERTIFICATE OF CORRECTION

PATENT NO. : 7,674,868 B2
APPLICATION NO. : 11/722567
DATED : March 9, 2010
INVENTOR(S) : Oliver Minge et al.

It is certified that error appears in the above-identified patent and that said Letters Patent is hereby corrected as shown below:

Column 30, Line 13, Claim 5:

Delete:

$(R^1O)_{3\text{-}}(R^2)_nSi\text{-}(CR^3{}_2)\text{-}X$ (I)

and insert -- $(R^1O)_{3\text{-}n}(R^2)_nSi\text{-}(CR^3{}_2)\text{-}X$ (I) --.

Column 30, Line 18, Claim 6:

Delete:

$(R^1O)_{3\text{-}}(R^2)_nSi\text{-}(CR^3{}_2)\text{-}X$ (I)

and insert -- $(R^1O)_{3\text{-}n}(R^2)_nSi\text{-}(CR^3{}_2)\text{-}X$ (I) --.

Column 30, Line 23, Claim 7:

Delete:

$(R^1O)_{3\text{-}}(R^2)_nSi\text{-}(CR^3{}_2)\text{-}X$ (I)

and insert -- $(R^1O)_{3\text{-}n}(R^2)_nSi\text{-}(CR^3{}_2)\text{-}X$ (I) --.

Signed and Sealed this

Twenty-seventh Day of April, 2010

David J. Kappos
*Director of the United States Patent and Trademark Office*